July 6, 1965        A. P. SEEDORFF        3,193,658

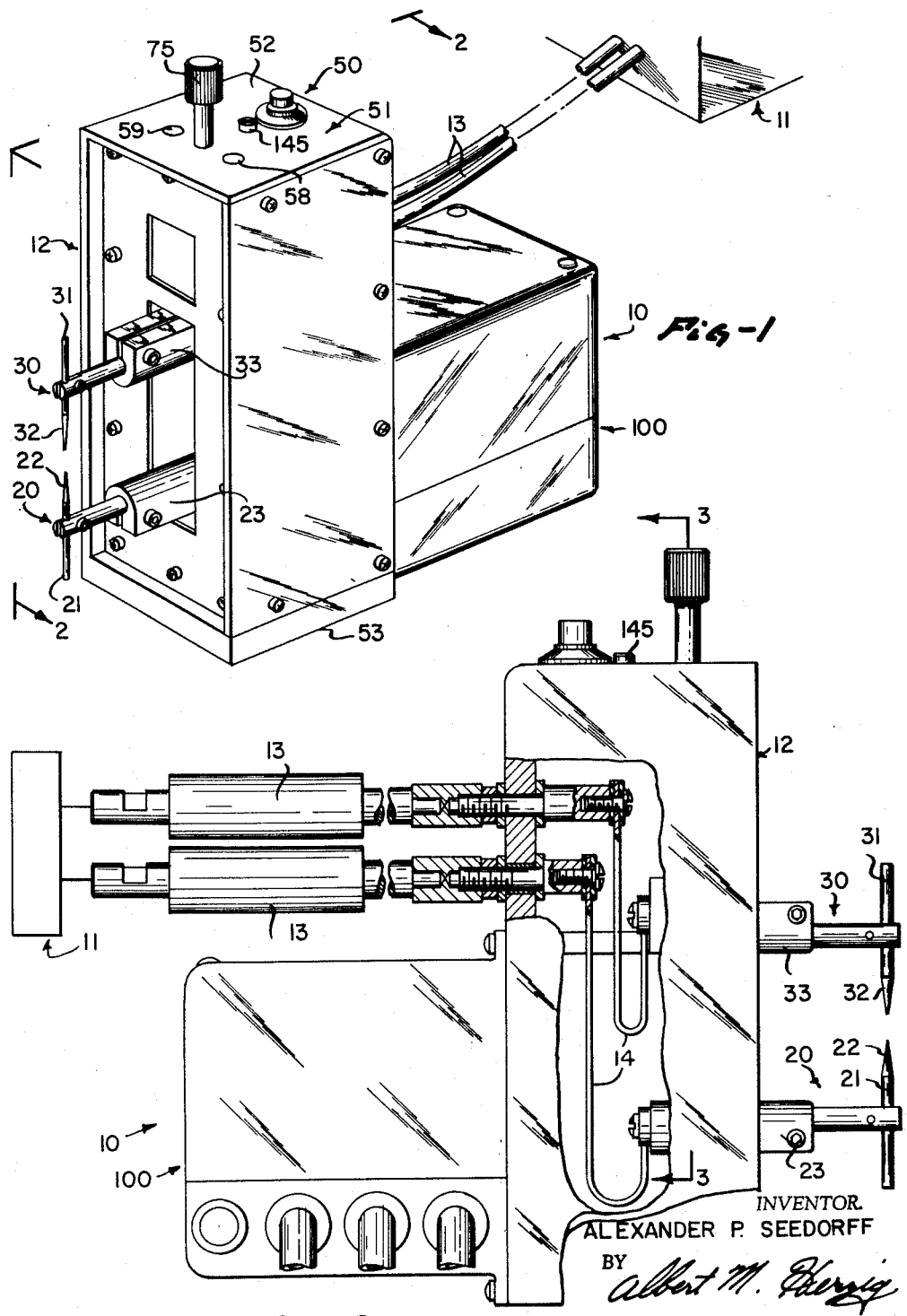

RESISTANCE WELDING MACHINE

Filed Sept. 10, 1963        4 Sheets-Sheet 2

INVENTOR.
ALEXANDER P. SEEDORFF

BY *Albert M. Herzig*

ATTORNEY

INVENTOR.
ALEXANDER P. SEEDORFF

United States Patent Office 3,193,658
Patented July 6, 1965

3,193,658
RESISTANCE WELDING MACHINE
Alexander P. Seedorff, 511 N. Kenter Ave.,
Los Angeles 49, Calif.
Filed Sept. 10, 1963, Ser. No. 307,936
12 Claims. (Cl. 219—86)

In general, the present invention relates to a resistance welding machine. More particularly, the present invention relates to the head of a resistance welding machine which is adapted to uniformly and accurately position its electrodes throughout each welding operation solely by motor and to accurately control at all times the pressure exerted by its electrodes on the work piece being welded.

Although the resistance welding technique of joining pieces of metal has been known for many years, until recently it has generally been employed to join relatively thick, massive pieces of metal and thus employ techniques, such as "forging" or increasing the pressure on the welded joint immediately after the application of the welding current. Such "forging" technique was found to improve the quality of the welded joint when large pieces of metal were being joined, such as sheets of steel ⅛" to ¼" thick. However, in recent years the resistance welding technique has been applied to the joining of very small metal parts or very thin metal parts, such as fine metal wires. In order to obtain high quality welded joints on such delicate welding jobs, it has been found that the control of the pressure of the electrodes on the work piece being welded is critical. Thus, unlike the welding of thick, heavy pieces, it is important that the electrodes do not exert an excessive pressure on the joint being welded during and after the welding operation.

In order to control the pressure at which welding operation occurs, welding machines have been developed in recent years wherein the welding operation is initiated when a predetermined electrode pressure on the work piece has been reached. An example of such welding machine is described in the Du Fresne United States Patent No. 2,872,564 wherein the electrodes of the welding machine head are brought together manually by the welding machine operator, but the welding operation is initiated by a spring-biased switch whose bias can be adjusted. Although such welding machines represent a substantial advance in the welding of small pieces of metal, the manual operation of bringing the electrodes together creates substantial problems in achieving uniform, reliable welded joints. One problem involves the "overtravel" of the electrodes during the welding operation. Thus, because of the small distances involved, it is substantially impossible for the welding machine operator to stop bringing the electrodes together when the welding operation is initiated by the welding machine. Consequently, the electrode pressure on the work piece continues to increase during the period of the welding operation. This can substantially impair the quality of the welded joint and prevents uniformity and reliability in such welded joint because of the variation in the amount of such "overtravel" from one welding operation to the next. Although manually operated machines have been replaced to some extent by machines operated by air cylinders, hydraulic cylinders and so forth, the same problem of "overtravel" has persisted to impair the uniformity and reliability of the welding of small pieces of metal. Another problem encountered by the currently used welding machines is that the electrodes are invariably moved apart by a helical return spring which is compressed when the electrodes are initially brought together. The use of such return spring raises a number of problems even apart from the problem of fatigue of the spring metal. Since the compression of the helical spring is not linear with respect to the force being applied thereto, it is very difficult to ascertain the position of the electrodes from the force exerted on the return spring. Furthermore, although each individual return spring may be experimentally calibrated, such calibration curve will change as the spring is being used so that the experimental curve soon becomes useless.

In general, therefore, an object of the present invention is a resistance welding machine adapted to uniformly and accurately position its electrode throughout each welding operation and thus eliminate "overtravel."

Another object of the present invention is a resistance welding machine wherein the pressure exerted by the electrode on the work piece is accurately controlled at all times.

Still another object of the present invention is a resistance welding machine wherein the force exerted by the electrodes on the work piece remains the same independently of the stroke length of the electrodes or the relative vertical positions of the electrodes with respect to each other.

Still another object of the present invention is a resistance welding machine wherein the electrodes are moved apart in the same way as they are initially moved together and the movement of such electrodes can be stopped instantaneously.

Still another object of the present invention is a resistance welding machine which is capable of retracting electrodes far apart when desired, although it is adapted to normally have a short electrode stroke.

Other objects and advantages of the present invention will be readily apparent from the following description and drawings which illustrate a preferred exemplary embodiment of the present invention.

In general, the present invention involves a resistance welding machine including a head having a first electrode mounted on a first electrode holder and a second electrode mounted on a second electrode holder with the working tips of the electrodes being adjacent each other. The second electrode holder is mounted on a frame which is adapted to be positioned adjacent the first electrode holder whereby the working tips of the electrodes contact the work piece being welded. Mounted on the frame are spring means for controlling the firing of the welding machine. Such spring means are adapted to permit such firing when the contact pressure of the electrodes on the work piece reaches a predetermined value. The positioning of the frame relative to the first electrode holder is accomplished by screw means which is operated by a motor system adapted to stop instantaneously when the contact pressure of the electrodes on the work piece reaches a predetermined value. Finally, the welding machine head includes control means for regulating the operation of the machine.

In order to facilitate understanding of the present invention, reference will now be made to the appended drawings of a preferred specific embodiment of the present invention. Such drawings should not be construed as limiting the invention which is properly set forth in the appended claims.

In the drawings:
FIG. 1 is a perspective view of a preferred embodiment of the resistance welding machine head of the present invention.
FIG. 2 is a partially broken away side view of FIG. 1 taken along the lines 2—2 of FIG. 1.
FIG. 3 is a cross-sectional view of FIG. 2 taken along the lines 3—3 of FIG. 2.
FIG. 4 is a partially broken away plan view of FIG. 3 taken along the lines 4—4 of FIG. 3.
FIG. 5 is a cross section of FIG. 3 taken along the lines 5—5 of FIG. 3.

Figure 3:
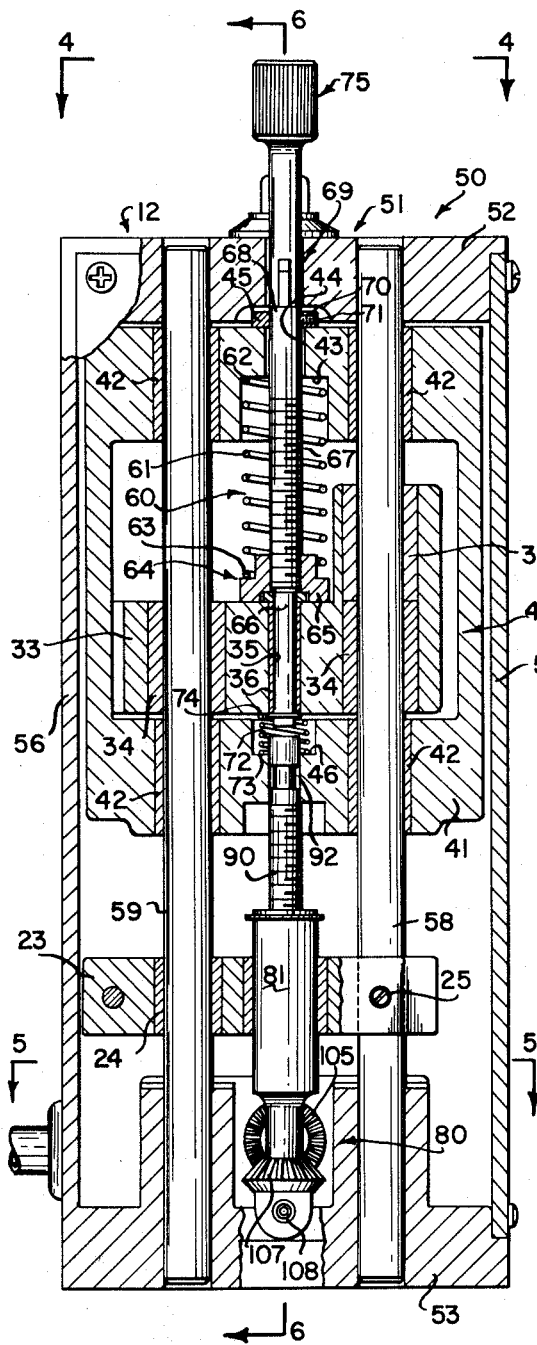
Figure 4:
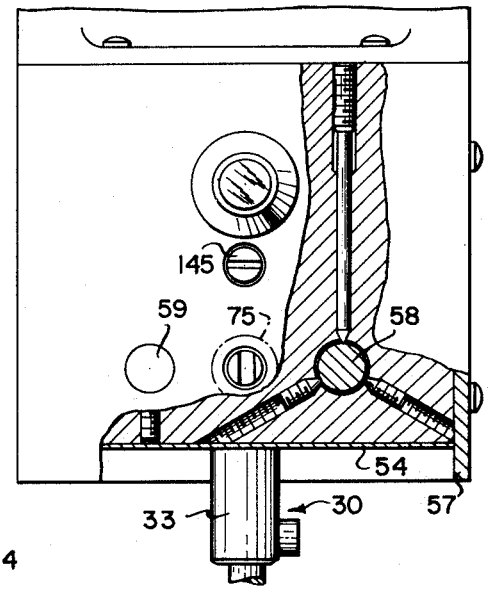
Figure 5:
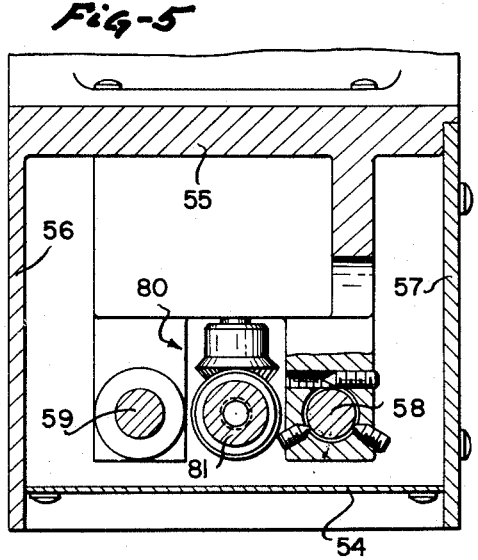
Figure 6:
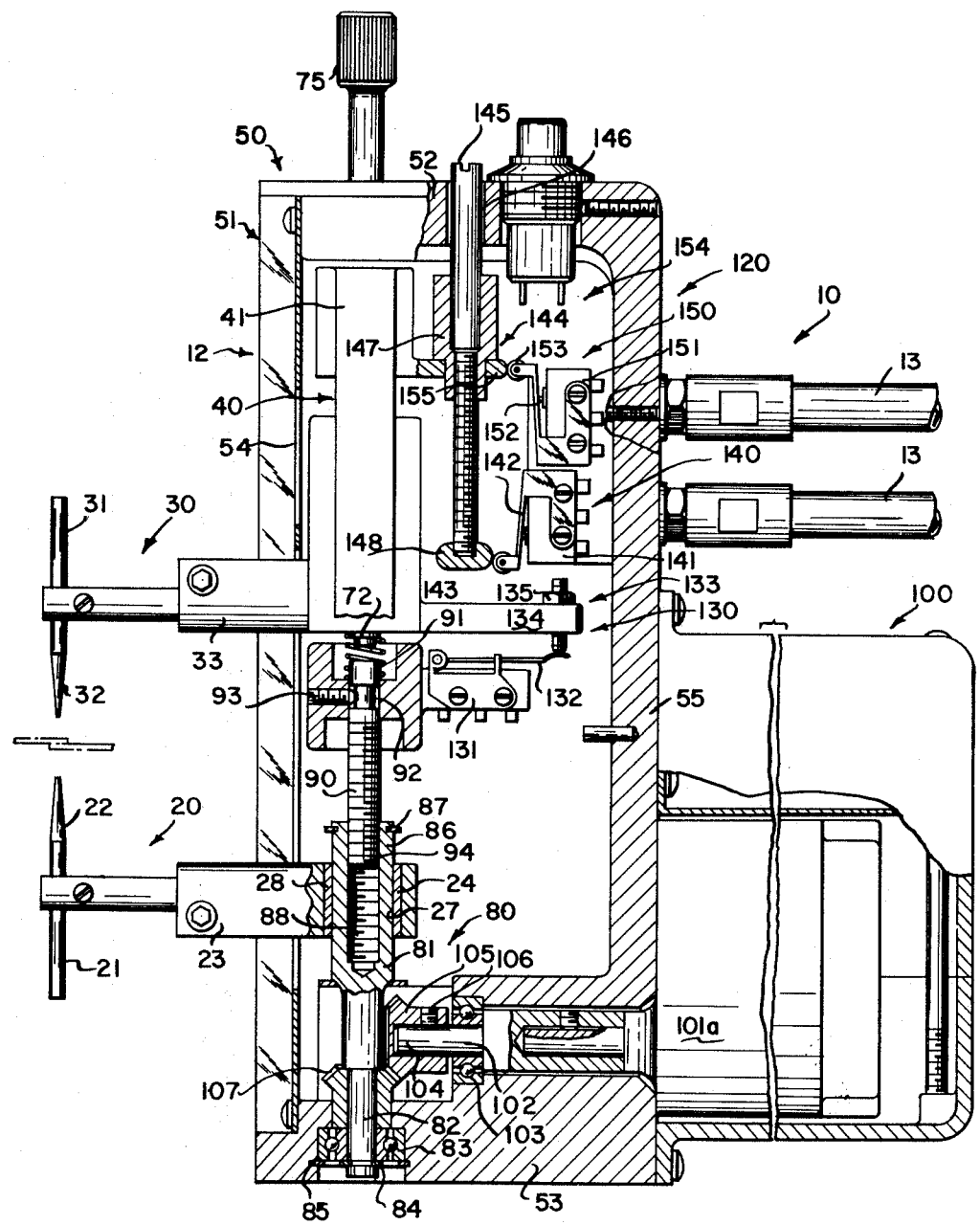
FIG. 6 is a cross section of FIG. 3 taken along the lines 6—6 of FIG. 3.

As illustrated in FIGS. 1–7, the present invention involves a resistance welding machine 10 comprising a power supply unit 11 and a head 12. The power supply unit 11 is of conventional construction similar to that illustrated in the Du Fresne patent identified above. The power supply unit 11 and resistance welding machine head 12 are connected by a pair of cables 13 which are adapted to be detached from each of said units.

The resistance welding machine head 12 includes a first electrode means 20, a second electrode means 30, a frame means 40, a support means 50, spring means 60, a screw means 80, a motor system means 100 and control means 120. The first electrode means 20 includes a first electrode 21 which has a working tip 22 and which is mounted on a first electrode holder 23. Similarly, the second electrode means 30 includes a second electrode 31 which has a conical working tip 32 and which is mounted on a second electrode holder 33. The working tips 22 and 32 of the electrodes 21 and 31 are positioned adjacent each other. The second electrode holder 33 of the second electrode means 30 is mounted on a frame means 40 which is adapted to be positioned adjacent the first electrode holder 23 of the first electrode means 20. In such position, the working tips 22 and 32 of the electrodes 21 and 31, respectively, contact the workpiece being welded (shown in dotted lines). The frame means 40 includes a rectangular loop 41 which encircles a portion of the second electrode holder 33.

Enclosing the first electrode means 20, second electrode means 30 and the frame means 40, is a support means 50 which includes a housing 51 having a top wall 52, a bottom wall 53, front and rear walls 54 and 55, respectively, and side walls 56 and 57, respectively. Extending between the top and bottom walls 52 and 53 and mounted thereon is a pair of columns 58 and 59, respectively. The first electrode holder 23 is slidably mounted on the columns 58 and 59 by means of bushings 24 and is positioned on the columns 58 and 59 by loosening the set screw 25, moving the first electrode holder 23 to the desired position and then retightening the set screw 25. Similarly, the loop 41 of the frame means 40 is slidably mounted on the columns 58 and 59 by means of bushings 42. Finally, the second electrode holder 33 is slidably mounted on the columns 58 and 59 by means of bushings 34 so that the first electrode means 20, the second electrode means 30, and the frame means 40 are all linearly adjustable relative to each other, but side deflection thereof is prevented.

Mounted on the loop 41 of the frame means 40 is a spring means 60 for controlling the firing of the welding machine. The spring means 60 is adapted to permit said firing when the contact pressure of the electrodes on the work piece reaches a predetermined value. The spring means 60 comprises a helical spring 61 having its first end 62 supported by seating it in a recess 43 in the loop 41 of the frame means 40. Holding the second end 63 of the helical spring 61 is a biasing means 64 which comprises a plate 65 threaded onto the first end 66 of an adjustment screw 67. The adjustment screw 67 is slidably mounted in an aperture 44 in the loop 41 of the frame means 40 and is separated therefrom by a bushing 45. The second end 68 of the adjustment screw 67 has stop means 69 mounted thereon for holding the helical spring 61 in compression. The stop means 69 consists of a collar 70 slidably mounted on the adjustment screw 67 and positioned by a set screw 71. The first end 66 of the adjustment screw 67 is rotatably mounted in an aperture 35 in the second electrode holder 33 and separated therefrom by means of a bushing 36. Spring means 60 also include a helical support spring 72 which is adapted to balance the weight of the second electrode means 30. The helical support spring 72 is supported at its first end 73 in a recess 46 in the loop 41 of the frame means 40. The helical support spring 72 is coaxial with the adjustment screw 67 and has its second end 74 biased against the underside of the second electrode holder 33. Finally, the spring means 60 includes a knob 75 which is removably keyed to the second end 68 of the adjustment screw 67. Thus, unauthorized resetting of the adjustment screw can be prevented simply by removing the knob 75.

The screw means 80 positions the frame means 40 and consequently the second electrode means 30 relative to the first electrode means 20. The screw means 80 comprises a drive nut 81 with its first end 82 rotatably mounted in the bottom wall 53 of the support means 50 by means of a bearing 83, a drive nut retaining ring 84 and a bearing retaining ring 85. The second end 86 of the drive nut 81 is rotatably mounted in an aperture 27 in the first electrode holder 23 and separated therefrom by a bushing 28. A second drive nut retaining ring 87 on the second end 86 of the drive nut 81 insures that the first electrode means is not moved too far upwardly and thus removed from the drive nut 81. The screw means 80 also includes a drive screw 90 having its first end 91 rotatably positioned in an aperture 47 in the loop 41 of the frame means 40. The first end 91 of the drive screw 90 has a circumferential groove 92 in which is received a set screw 93 threaded into the loop 41 of the frame means 40. Thus, the set screw 93 positions the drive screw 90 with respect to the frame means 40 while permitting the drive screw 90 to rotate with respect to the frame means 40. The second end 94 of the drive screw 90 is threaded into the threaded hole 88 of the drive nut 81.

The screw means 80 is operated by the motor system means 100 which is adapted to stop substantially instantaneously when the contact pressure of the electrodes 21 and 22 on the work piece reaches a predetermined value. The motor system means 100 comprises a conventional electric motor and gear reduction means 101a for rotating the screw means 80 and a brake means which includes a reverse winding 101d FIGURE 7 and which is used for instantaneously stopping the motor 101a when the contact pressure of the electrode on the work piece reaches a predetermined value. The motor and gear reduction means 101a are connected to the screw means 80 by means of a shaft 102 which is rotatably mounted in the rear wall 55 of the support means 50 by means of a bearing 103. On the free end 104 of the shaft 102 is mounted a first mitre gear 105 by means of a mitre gear set screw 106. Mounted on the first end 82 of the drive nut 81 is a second mitre gear 107 which is fixed in position by a mitre gear set screw 108. The first and second mitre gears 105 and 107 are engaged so that when the shaft 102 is rotated by the motor and gear reduction means 101a the drive nut 81 is rotated. As illustrated, the motor system means 100 is attached near the bottom of the support means 50 and at a 90° angle to the drive screw. Such an arrangement produces a very compact head and reduces the overall height of the head so that a low center of gravity is achieved. In addition, such arrangement permits ready mounting of the resistance welding head on a stand and better balancing for swiveling the head into a variety of positions.

The control means 120 regulates the operation of the machine 10 including its head 12. The control means 120 includes a conventional two-stage switch means 121 (shown schematically in FIG. 7) for positioning the electrodes 21 and 31 and firing the machine 10. The closing of the first stage 122 of the two-stage switch 121 is adapted to move the electrode 31 toward the electrode 21, the closing of the second stage switch means 123 of the two-stage switch means 121 is adapted to fire the machine 10, and the opening of the first and second stages 122 and 123 is adapted to move the electrode 31 away from the electrode 21. The control means 120 also includes a closed position switch means 130 consisting essentially of a switch 131 for stopping the motor system means 100 when the contact pressure of the electrodes 21 and 31 on the work piece reaches a predetermined value. The switch 131 has a lever 132 which is held down or closed by an actuator means 133 mounted on the second electrode holder 33. The actuator means 133 is adapted to operate the switch 131 by moving the lever 132. The actuator means 133 includes a beam 134 projecting out from the second electrode holder 33 and carrying a switch set screw 135 whose position can be adjusted.

The control means 120 also includes an open position switch means 140 which includes a switch 141 mounted on the rear wall 55 of the support means 50 adjacent to the frame means 40. The switch 141 is adapted to stop the motor system means 100 when it is moving the electrode 31 away from the electrode 21. The switch 141 has a leaf 142 mounted thereon whose free end carries a roller 143. Mounted on the frame means 40 is an actuator means 144 for operating the switch 141 to stop the electrode 31 in a set open position by depressing the leaf 142 through contact with the roller 143. The actuator means 144 includes a stroke adjustment screw 145 rotatably mounted in an aperture 146 in the loop 41 of the frame means 40 and separated therefrom by a bushing 147. The stroke adjustment screw 145 has a lug 148 on its free end which is adapted to contact the roller 143 of the switch 141 when it passes thereby. The position of the stroke adjustment screw relative to the frame means 40 is adjusted merely by rotating it because of the threaded engagement between the bushing 147 and the stroke adjustment screw 145.

Finally, the control means 120 includes a retraction means 150 for moving the electrode 31 past the set open position to a maximum separation position. The retraction means 150 includes a switch 151 for stopping the motor system means 100 when it is moving the electrodes apart. The switch 151 has a leaf 152 mounted thereon with the free end of the leaf 152 carrying the roller 153. An actuator means is mounted on the frame means 40 for operating said retraction means to stop the electrode 31 in a maximum separation position. The actuator means includes a flange 155 extending from the loop 41 of the frame means 40 and which carries the actuating means 144 of the open position switch means 140. The flange 155 is adapted to depress the leaf 152 of the switch 151 by contacting the roller 153 as it passes thereby.

Figure 7:
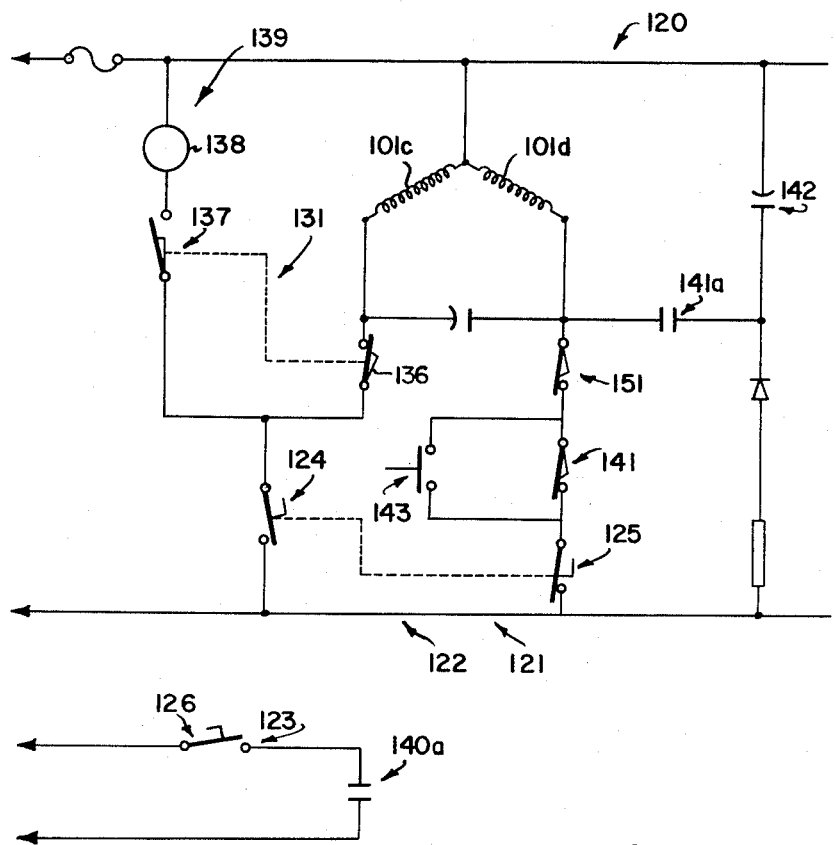
FIG. 7 is a schematic diagram of the electrical control system of the present invention.

Assuming that the desired electrode contact pressure has been set and the amount of electrode travel has been set, as well as the desired electrode tip configuration and the welding current magnitude on the power supply, the welding machine is operated by placing a work piece between the electrodes and then initially depressing the two-stage switch means 121 so that the forward contacts 124 of the first stage 122 are closed (see FIG. 7). Simultaneously, the reverse contacts 125 of the first stage 122 are opened by such operation. As illustrated in FIG. 7, such action permits the current to flow through the forward winding 101c of the motor 101a since the first contacts 136 of the switch 131 are held closed and the second contacts 137 are held open by the force of the set screw 135 on the lever 132. The current flow through the motor 101a causes the rotation of the drive nut 81 which in turn causes the frame means 40 and the second electrode means 30 to move down until the electrodes contact the work piece and build up the electrode pressure. When the preset electrode pressure is attained, the upward force of the work piece on the second electrode means 30 becomes greater than the downward force exerted on the electrode means 30 by the spring means 60 so that the second electrode means moves upwardly carrying the actuating means 133 of the closed position switch means 130. Such movement of the actuating means 133 opens the first contacts 136 and closes the second contacts 137 of the switch 131.

The closing of the contacts 137 of the switch 131 energizes the coil 138 of the relays 139. The energization of the coil 138 closes the contacts 140a and 141a of the relay 139. The closing of the contacts 140a sets up the initiation circuit for the power supply, as illustrated in FIG. 7. The closing of the contacts 141a discharges the capacitor 142 to produce a D.C. power source for instantaneously braking the motor through the reverse winding 101d of the motor. With such arrangement it can be seen that it is impossible to discharge the welding current prematurely, i.e., before the proper welding force has been applied to the electrodes, even if the operator should go through both stages of the two-stage switch without hesitation on the first stage. Thus, the switch 131 controls the energization of the relay 139 which in turn controls the supply of power to the power initiation circuit. Also, the braking of the motor by the discharging of the capacitor causes the motor to stop instantly and at the same exact point on every stroke, insuring uniform repetitive action.

Assuming the operator finds that the electrodes did strike the exact position on the work where welding is intended, he may then push the two-stage switch 121 into its second stage 123 which closes contacts 126. The closing of contacts 126 initiates the power supply so that D.C. current from the power supply unit 11 flows through the welding cable 13, the flexible shunts 14 and the electrodes 31 and 21 and through the work piece.

Once the weld has been performed, the two-stage switch 122 is released so that the contacts 124 and 126 are opened and the contacts 125 are closed. Such switching action disconnects the power supply but starts the motor system 100 by energizing the reverse coil 101d of the motor 101a since the open position switch means 140 and the retract switch means 150 are normally closed. The motor will continue to operate in the reverse direction to move the second electrode means 30 upward until the lug 148 of the actuator means 144 strikes the roller 143 of the switch 141 and thus causes the contacts of the switch 141 to open and stop the motor 101a.

At this point it should be noted that if the operator did not strike the exact position which is desired to be welded or for some other reason wished to re-psition the work piece before welding, he may release the two-stage switch 121 before welding without closing the contacts 126 of the second stage. Such release causes the motor to operate in a reverse direction as set forth above in the description of the normal welding operation. Thus, the head is designed so that the operator may set up the welding operation up to the point of actual welding and check such procedure before actually making the weld.

Normally, the gap between the electrodes in the open position is only wide enough to permit easy insertion of the work piece between the electrodes but close enough so that the time required to bring the electrodes together for the welding operation is minimized. However, occasionally it is necessary to move the electrodes apart into a maximum separation position, such as when the value of the electrode pressure is being determined and set. For such operation, when the electrodes are in the open position the push button 143 is manually closed. Such closing of the push button 143 bypasses the switch 141 so that the reverse winding coil 101d of the motor 101a is again energized and the motor continues to move the electrodes apart. Such movement continues until the flange 155 of the actuator means 154 contacts the roller 153 of the switch 151 and opens the switch 151. At this point, the motor system 100 is again stopped and the electrodes 21 and 31 are in a maximum separation position. Then, a tip force gauge (not shown) may be introduced between the electrodes and forward movement of the motor 101a is initiated by closing the first stage 122 of the two-stage switch 121. The electrodes will continue to close until they contact the sensing buttons of the gauge to register a given force. By adjusting the adjustment screw 67 by means of the knob 75, expansion force of the helical spring 61 may be adjusted until the force exerted by the electrodes on the gauge is the desired electrode pressure. After the contact pressure of the electrodes has been thus set, the electrodes may be again brought together to their normal open position by closing the contacts 124 of the first stage 122 of the two-stage switch 121. The motor 101a then brings the electrode 31 toward the electrode 21 since the opening of the switch 141 does not affect the operation of the motor in the forward direction. It can also be seen that the normal open position can be adjusted simply by rotating the screw 145 and adjusting the position of the lug 148 with reference to the roller wheel 143.

Many other specific embodiments of the present invention will be obvious to one skilled in the art in view of this disclosure. For example, spring 61 may be biased directly against the second electrode holder although such arrangement tends to create some electrode bounce when the electrodes are brought together. Also, any suitable means may be used to stop the motor system means as long as such stopping achieves instantaneous braking as described above. Similarly, any suitable means may be utilized to mechanically move the electrodes together and apart so long as a continuous positive mechanical connection is maintained so that the electrode position is positively always known.

There are many features in the present invention which clearly show the significant advance the present invention represents over the prior art. Consequently, only a few of the more outstanding features will be pointed out to illustrate the unexpected and unusual results attained by the present invention. One feature of the present invention is a resistance welding machine head which is totally motor-driven to achieve complete uniformity with respect to each welding operation. Thus, when the contact pressure of the electrodes has been set, precisely that pressure and none other is produced on the work piece and overtravel of the movable electrodes is eliminated. Another feature of the present invention is that the electrode position is completely determined at all times by a positive mechanical drive, such as the screw means illustrated, so that when the electrodes are moved together and moved apart the position of the electrodes is precisely known at all times. Still another feature of the present invention is that the stroke length of the movable electrode is adjustable over a wide range and the contact pressure of the electrode is independent of the stroke length. Still another feature of the present invention is than an extremely accurate pressure system is set up so that the force actually exerted on the work piece by the electrode is precisely known at all times. Thus, an extremely accurate consistent and easily repeated electrode contact pressure can be attained in the range from about 2 ounces at 10 pounds. Still another feature of the present invention is the utilization of an electrically actuated brake means for the motor system so that electrodes stop instantaneously when the desired contact pressure is attained. Still another feature of the present invention is the location of the motor system near the bottom of the head and at a right angle to the main drive screw. Thus, a compact design and low center of gravity is achieved, as well as permitting the mounting of the resistance welding head on a stand in a better balanced condition for swiveling the machine into a variety of positions. Still another feature of the present invention is a two-stage switch for actuation with an automatic motor reversing feature so that the electrodes may be brought together independently of the actual welding operation and yet the electrodes are automatically moved apart when the welding operation is completed. In addition, such arrangement facilitates repositioning of the work piece if the work piece if the initial position is not sufficiently accurate. Still another feature of the present invention is the retraction means whereby maximum separation of the electrodes may easily be attained for calibration purposes or any other purpose and yet the electrodes will automatically return to their normal open position having a short welding stroke merely by following the normal operating procedure.

It will be understood that the foregoing description and examples are only illustrative of the present invention and it is not intended that the invention be limited thereto. All substitutions, alterations and modifications of the present invention which come within the scope of the following claims or to which the present invention is readily susceptible without departing from the spirit and scope of this disclosure are considered part of the present invention.

I claim:

1. A resistance welding machine, including a power supply unit for firing said machine and a head adapted to uniformly and accurately position an electrode throughout each welding operation solely by motor and to accurately control the pressure exerted by its electrodes at all times on the work piece being welded, comprising:
    (a) a first electrode mounted on a first electrode holder;
    (b) a second electrode mounted on a second electrode holder with the working tips of said electrodes being in alignment with each other;
    (c) a frame having said second electrode holder holder mounted thereon, said frame being mounted in said head for movement toward said first electrode to position said second electrode holder adjacent said first electrode holder whereby the working tips of said electrodes contact the work piece being welded;
    (d) spring means mounted on said frame for controlling the firing of said welding machine by said power supply unit, said spring means being connected to said second electrode holder for biasing it toward said first electrode holder with a force which is exceeded when the contact pressure of said electrodes on said work piece reaches a predetermined value;
    (e) screw means connected to said frame for positioning said frame relative to said first electrode holder;
    (f) motor system means for operating said screw means, said motor system means including braking means for stopping said screw means instantaneously when the contact pressure of the electrodes on said work piece reaches said predetermined value; and
    (g) control means actuated by said second electrode for actuating said braking means and firing said welding machine when said contact pressure reaches said predetermined value.

2. A resistance welding machine as stated in claim 1, wherein said first electrode holder is adjustably and slidably mounted on at least one column.

3. A resistance welding machine as stated in claim 2, wherein said frame is slidably mounted on said column.

4. A resistance welding machine as stated in claim 1, wherein said spring means comprises:
    (a) a helical spring having its first end supported by said frame; and
    (b) an adjustment screw slidably mounted on said frame, the first end of said adjustment screw being threaded into biasing means for supporting the second end of said helical spring and the second end of said adjustment screw having stop means mounted thereon for holding said helical spring in compression.

5. A resistance welding machine as stated in claim 1, wherein said screw means comprises:
    (a) a drive nut rotatably mounted adjacent said frame; and
    (b) a drive screw with its first end rotatably attached to said frame and its second end threaded into said drive nut.

6. A resistance welding machine as stated in claim 1, wherein said motor system means comprises:
   (a) a motor and gear means for rotating said screw means, wherein said braking means comprises; and
   (b) a reversing winding in said motor for instantaneously stopping said motor when the contact pressure of the electrodes on the work piece exceeds said predetermined value.

7. A resistance welding machine as stated in claim 1, wherein said control means includes a two-stage switch means for positioning said head and firing said machine,
   (a) the closing of the first stage of said switch means energizing said motor system means to move said electrodes together,
   (b) the closing of the second stage of said switch means closing a circuit to said power supply unit to fire said machine, and
   (c) the opening of at least one of the stages of said switch means reversing said motor system means to move said electrodes apart.

8. A resistance welding machine as stated in claim 1, wherein said control means includes retraction means for moving said electrodes apart past a set open position to a maximum separation position.

9. A resistance welding machine as stated in claim 1, wherein said control means includes:
   (a) an open position switch means mounted adjacent said frame for stopping said motor system means when it is moving said electrodes apart, and
   (b) an actuator means mounted on said frame for operating said open position switch means to stop said electrodes in said open position.

10. A resistance welding machine as stated in claim 1, wherein said motor control means includes:
    (a) a closed position switch means mounted on said frame for stopping said motor system means when the contact pressure of said electrodes on said work piece reaches said predetermined value; and
    (b) an acautor means mounted on said second electrode holder for operating said closed position switch means.

11. A resistance welding machine, including a welding supply unit and a head adapted to uniformly and accurately position an electrode throughout each welding operation by drive means and to accurately control the pressure exerted by its electrodes on the work piece being welded, comprising:
    (a) frame means;
    (b) first electrode means mounted on said frame means;
    (c) second electrode means slidably mounted on said frame means with the working tips of said electrode means being aligned with each other;
    (d) drive means connected to said second electrode means for moving it relative to said first electrode means;
    (e) control means mounted on said frame means for controlling the firing of said welding machine by said power supply unit when the contact pressure of said electrode means on said work piece reaches a predetermined value, said control means including spring means biasing said second electrode means toward said first electrode means with a force which is exceeded when said contact pressure reaches said predetermined value, whereby said second electrode means moves away from said first electrode means; and
    (f) brake means connected to said drive means for stopping said drive means upon energization of said brake means said control means also including energizing means for said brake means and said power supply unit and actuated by said second electrode means in such a manner that said brake means is energized to brake said drive means and said power supply unit is caused to fire said welding machine when said spring means is stressed by said second electrode means.

12. A resistance welding machine, including a power supply unit and a head adapted to uniformly and accurately position an electrode throughout each welding operation by a motor and to accurately control the pressure exerted by its electrodes on the work piece being welded, comprising:
    (a) a first electrode mounted on a first electrode holder;
    (b) a second electrode mounted on a second electrode holder with the working tips of said electrodes being in alignment with each other;
    (c) a frame having said second electrode holder mounted thereon, said frame being mounted in said head for movement toward said first electrode holder to position said second electrode holder adjacent said first electrode holder, whereby the working tips of said electrodes contact the work piece being welded;
    (d) spring means mounted on said frame for controlling the firing of said welding machine by said power supply unit, said spring means being connected to said second electrode holder for moving it toward said first electrode holder with a predetermined force which is exceeded when the contact pressure of said electrodes on said work piece reaches a predetermined value;
    (e) motor system means connected to said frame for moving it toward said first electrode holder, said motor system means including braking means for braking said motor system means instantaneously when the contact pressure of the electrodes on said work piece reaches said predetermined value; and
    (f) control means actuated by said second electrode holder for actuating said braking means and firing said welding machine when said contact pressure reaches said predetermined value.

References Cited by the Examiner
UNITED STATES PATENTS

| | | | |
|---|---|---|---|
| 2,154,935 | 4/39 | Hall | 219—86 |
| 3,036,199 | 5/62 | Page | 219—86 |

RICHARD M. WOOD, *Primary Examiner.*